3,298,839
Patented Jan. 17, 1967

3,298,839
REFRACTORY BONDING MORTAR
Peter T. Troell, Pittsburgh, Pa., assignor to Harbison-Walker Refractories Company, Pittsburgh, Pa., a corporation of Pennsylvania
No Drawing. Filed Mar. 23, 1965, Ser. No. 442,181
3 Claims. (Cl. 106—57)

The present invention relates to dry refractory bonding mortars suitable for use in contact with molten metals.

The requirements which a bonding mortar must meet in service are frequently extremely exacting and demand a carefully adjusted balance of properties. For economy and convenience, a mortar should have good working properties when mixed to either putty-like or cream-like consistency. With excellent workability and water retention over a range of consistencies, a mortar can be used for dipped or trowelled joints. The mortar should not shrink excessively upon drying or heating and should have a good working time and have both cold and hot bonding properties. The thermal expansion of the mortar should be substantially the same as that of brick with which it is used or temperature variations will affect the bond between brick and mortar causing surface cracking and peeling. The refractoriness must be high enough that the mortar will not melt or flow from joints under furnace operating conditions.

Refractory mortar materials may be divided into two general classes; namely, heat setting bonding mortars and air setting bonding mortars. The distinguishing feature of a heat setting bonding mortar is that it requires relatively high temperatures for the development of an adequate bond, commonly called the ceramic bond. The bonding temperature generally lies between 2000° F. and 2500° F., depending upon its composition. For many purposes, heat setting bonding mortars do not meet the needs of modern furnace practice. At moderate temperatures, a heat setting mortar acts merely as a filler between the brick, although the flexibility of such a structure is sometimes valued.

Air setting mortars take a relatively strong set upon drying, have a firm bond at elevated temperatures, and form mechanically strong joints with high resistance to abrasion and erosion. Bonding mortars of the air setting type are now used for laying many types of standard refractory brick, especially in those portions of a furnace where the operating conditions are most severe. Air setting mortars are recommended for service where a strong bond is desired over a wide range of temperatures. Chemical binders are used to impart air setting properties and to maintain the strength of the bond up to the temperature at which a ceramic bond takes effect.

More common air setting mortars are bonded with an alkaline silicate. These mortars are strong and exhibit excellent workability. However, it has been found that the alkaline silicate bond reacts quite rapidly with some molten metals, resulting in deep joint penetration. Commercial experience has shown this penetration to be deeper than through the refractory brick joined by the mortar. Similar experience has been had with other prior art mortars.

In copending application Serial No. 177,305, filed March 5, 1962, now United States Patent Number 3,179,526 and owned by the assignees of the present invention, mortar compositions are disclosed and claimed, composed of, by weight, 15–25% of orthophosphoric acid of 75% concentration with the remainder being at least one member selected from the group consisting of high alumina materials and zircon. These mortars are characterized by good strength and resistance to penetration by molten metals. They are generally prepared by mixing the refractory with the phosphoric acid. They are "wet" and therefore must be carefully packaged for shipment to the job site.

Packaging of mortar in a wet state has been found to be somewhat undesirable since the phosphoric acid tends to react with the other mix ingredients after lengthy periods of storage before shipment. This reaction in storage later causes difficulties in applying the mortar to the refractory brick at the job site. Another problem sometimes encountered has been that the mortar, in the wet state, tended to stiffen when exposed to the cold weather encountered during winter months. Also, these wet phosphoric acid mixes can be potentially hazardous to the epidermis of laborers.

In accordance with the present invention, it has been discovered that crystalline pyrophosphoric acid ($H_4P_2O_7$), a partially anhydrous, hygroscopic powder when mixed in prescribed proportions with a nonbasic refractory material gives physical properties superior to mortars containing wet phosphoric acid and other dry phosphate compounds. A most surprising and unexpected aspect of the present invention is that many superior properties are obtained where the $P_2O_5$ content of the mix (with the addition of crystalline pyrophosphoric acid) is less than half the required $P_2O_5$ content of the mix with the addition of wet phosphoric acid.

The mortar batches of the present invention contain sufficient crystalline pyrophosphoric acid to provide from about 2 to 18% $P_2O_5$. It is to be noted that the crystalline phosphoric acid content of these mortars exceeds the quantity that would be needed for bonding purposes alone. The excess acid functions in some unknown manner to inhibit attack on the mortar composition, and no conclusive theory to explain this action has been formulated to date. In a preferred embodiment, the crystalline phosphoric acid is present in an amount sufficient to supply about 2.5 to 6% $P_2O_5$.

The other major constituent of the mortar compositions of the invention is a nonbasic refractory material, such as, high alumina materials and zircon. Zircon is derived, for example, from certain beach sands and is a well known article of commerce. Generally, zircon averages over 95%, by weight, of $ZrO_2$ plus $SiO_2$ and the remainder is composed of alumina, titania, iron oxide, calcium oxide, magnesium oxide, and like naturally occurring constituents. Representative high alumina materials which may be used include calcined or uncalcined bauxite, alumina, diaspore, and minerals of the kyanite-sillimanite group. Alumina materials for purposes of this invention have an analysis of at least about 50%, by weight, $Al_2O_3$ and preferably at least 60% thereof. The analyses of preferred materials used in the invention are, in weight percent, typically as follows:

TABLE I

|  | Calcined Bauxite, Percent | Calcined Alumina, Percent | Crude Clay, Percent | Zircon, Percent |
|---|---|---|---|---|
| $SiO_2$ | 6.2 | 0.03 | 65.4 | 32.3 |
| $Al_2O_3$ | 89.0 | 99.5 | 20.8 | 1.0 |
| $TiO_2$ | 3.1 | 0.03 | 1.2 | 0.2 |
| $Fe_2O_3$ | 1.5 | 0.2 | 2.6 | 0.2 |
| CaO |  | 0.08 | 0.1 | 0.16 |
| MgO |  | 0.03 | 0.6 | 0.04 |
| Alkalies | 0.2 | Trace | 2.3 |  |
| Ignition Loss |  |  | 7.0 |  |
| $Zr_2O_3$ |  |  |  | 66.1 |

Mortar according to the concepts of this invention has utility with various available refractories utilized in the lining of furnaces. An example of refractory shapes with which mortar, according to this invention, might be used are those made of materials such as zircon, chrome, fireclay, high alumina, and the like.

The mortar batches are prepared in accordance with practices now standard in the industry. The refractory constituents are ground to a size such that essentially all will pass a 28 mesh Tyler screen. Still additional and finer grinding improves the smoothness of spreading. For still further smoothness of spreading, a few percent of crude refractory bond clay, such as bentonite and fireclay may be added. The crystalline phosphoric acid and refractory dry batch constituents are mixed with water for use.

Having thus described the invention in detail and with sufficient particularity as to enable those skilled in the art to practice it, what is desired to have protected by Letters Patent is set forth in the following claims:

I claim:
1. An air setting, particulate mortar mixture consisting essentially of, by weight, sufficient dry crystalline pyrophosphoric acid to provide from about 2 to 18% of $P_2O_5$, and the balance a nonbasic refractory material selected from the group consisting of high alumina materials analyzing at least 50% $Al_2O_3$ on an oxide basis and zircon sands.

TABLE II

|  | O | L | H | 1A | 1 | B | 2A | 4A | 6A |
|---|---|---|---|---|---|---|---|---|---|
| Mix: |  |  |  |  |  |  |  |  |  |
| Calcined Bauxite, Percent | 92 | 89.5 | 84 | 90.5 | 86 | 82 | 90 | 90.6 | 88.9 |
| Crude Bauxite, Percent |  |  |  | 2.86 | 2.7 | 2.6 | 2.82 | 2.86 | 2.73 |
| Bentonite, Percent |  |  |  | 1.94 | 1.8 | 1.7 | 1.88 | 1.94 | 1.87 |
| Ball Clay, Percent | 5 | 5 | 5 |  |  |  |  |  |  |
| Crystalline Pyrophosphoric Acid, Percent | 3 | 5.5 | 11 |  |  |  |  |  |  |
| Phosphoric Acid (85%) |  |  |  | 4.7 | 9.5 | 13.7 |  |  |  |
| Monomagnesium Phosphate, Percent |  |  |  |  |  |  | 5.3 |  |  |
| Hemisodium Phosphate, Percent |  |  |  |  |  |  |  | 4.6 |  |
| Urea Phosphate, Percent |  |  |  |  |  |  |  |  | 6.5 |
| $P_2O_5$ Content | 2.4 | 4.4 | 8.8 | 3 | 5.9 | 8.5 | 2.9 | 3 | 3 |
| Water to bring to Trowelling Consistency, Percent | 14 | 13 | 11.6 | 22 | 17.6 | 12.5 | 22 | 20.8 | 18.8 |
| Modulus of Rupture, p.s.i. (Brick Joints): |  |  |  |  |  |  |  |  |  |
| After Drying at 230° F | 660 | 790 | 860 | 240 | 450 | 720 | 560 | 230 | 320 |
| After Heating to 1,700° F | 440 | 430 | 590 | 160 | 260 | 220 | 290 | 130 | 140 |
| Depth of Penetration with Basic Open Hearth Slag, Inches | 0.95 | 0.65 | 0.55 |  |  | 1.00 |  |  |  |

The invention is described further in conjunction with the following examples, details of which are given by way of illustration and not by way of limitation.

Each of the batches shown in Table II was prepared by mixing dry refractory constituents, dry phosphate compound, and water in a commercial type mixer. The chemical analysis of the refractory materials used are those given in Table I above. The batches were trowelled on superduty fireclay brick to provide a sandwich of brick with mortar therebetween. After drying, the mortar joints were tested for modulus of rupture and depth of penetration by basic open hearth slag.

In the above table, Mixes O, L, and H contain dry, crystalline pyrophosphoric acid. Mixes 1A, 1, and B contain wet phosphoric acid (85% concentration) (Mix B is according to the abovementioned copending application). Mixes 2A, 4A, and 6A contain various other dry phosphates. Results of tests on the above mixes shown in Table II indicate that the mixes containing dry crystalline pyrophosphoric acid have strength and resistance to penetration superior to mixes containing other types of dry phosphates; and are also superior to mixes containing wet phosphoric acid.

2. A particulate mortar mixture consisting essentially of, by weight, sufficient dry crystalline phosphoric acid to provide from about 2.5 to 6% $P_2O_5$ content, and the balance a nonbasic refractory material selected from the group consisting of high alumina materials analyzing at least 50% $Al_2O_3$ on an oxide basis and zircon sands.

3. The particulate mortar mixture of claim 2 which contains in addition a minor but effective amount crude refractory bonding clay.

References Cited by the Examiner
UNITED STATES PATENTS
2,852,401   9/1958   Hansen et al. -------- 106—57

OTHER REFERENCES

Gitzen et al., Phosphate-Bonded Alumina Castables: Some Properties and Applications, Cer. Bull., vol. 35, No. 6, pages 217–223.

HELEN M. McCARTHY, *Acting Primary Examiner.*

TOBIAS E. LEVOW, *Examiner.*

J. POER, *Assistant Examiner.*